(12) United States Patent
Sabatelli et al.

(10) Patent No.: US 9,210,545 B2
(45) Date of Patent: Dec. 8, 2015

(54) MANAGING ALERTS BASED ON CONTEXT (75) Inventors: Alessandro Sabatelli, San Francisco, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 13/597,061

(22) Filed: Aug. 28, 2012

(65) Prior Publication Data

US 2013/0324160 A1 Dec. 5, 2013

Related U.S. Application Data (60) Provisional application No. 61/655,956, filed on Jun. 5, 2012.

(51) Int. Cl.
*H04W 24/00* (2009.01)
*H04W 4/02* (2009.01)

(52) U.S. Cl.
CPC .................... *H04W 4/022* (2013.01)

(58) Field of Classification Search
CPC ....... H04W 4/021; H04W 4/028; H04W 4/02; H04W 4/206; H04W 4/023; H04W 4/027; H04W 48/16; H04W 4/022; H04W 64/00; H04W 48/04; H04W 4/12; H04W 4/20
USPC ........................... 455/456.1, 456.3
See application file for complete search history.

(56) References Cited

U.S. PATENT DOCUMENTS

| | | | |
|---|---|---|---|
| 6,259,381 B1 | 7/2001 | Small | |
| 6,542,814 B2 | 4/2003 | Polidi et al. | |
| 7,317,927 B2 * | 1/2008 | Staton et al. | 455/456.4 |
| 7,480,566 B2 | 1/2009 | Laverty | |
| 7,493,211 B2 | 2/2009 | Breen | |
| 7,561,063 B2 | 7/2009 | Eckhart | |
| 2007/0143013 A1 * | 6/2007 | Breen | 701/211 |
| 2007/0219706 A1 * | 9/2007 | Sheynblat | 701/200 |
| 2009/0177384 A1 | 7/2009 | Walder | |
| 2010/0279706 A1 * | 11/2010 | Dicke | 455/456.1 |
| 2010/0305842 A1 | 12/2010 | Feng | |
| 2012/0158283 A1 * | 6/2012 | Arastafar | 701/410 |
| 2012/0284769 A1 * | 11/2012 | Dixon et al. | 726/1 |
| 2013/0099977 A1 | 4/2013 | Sheshadri et al. | |
| 2013/0102286 A1 * | 4/2013 | Toksvig et al. | 455/412.2 |
| 2013/0178233 A1 | 7/2013 | McCoy et al. | |

OTHER PUBLICATIONS

Ludford, Pamela, J., et al., "Because I Carry My Cell Phone Anyway: Functional Location-Based Reminder Applications," CHI 2006 Proceedings, Apr. 22-27, 2006, Montreal, Quebec, Canada, pp. 889-898.
"Road-Ninja: Up-Close Mobile App Inspection," Kicking Tires, [online] [retrieved Mar. 12, 2012], 4 pages., retrieved from the Internet <URL: http://blogs.cars.com/kickingtires/2012/02/mobile-app-snapshot-road-ninj . . . >.

\* cited by examiner

*Primary Examiner* — Temica M Beamer
(74) *Attorney, Agent, or Firm* — Kilpatrick Townsend & Stockton LLP (57) ABSTRACT

Systems and methods are provided for managing alerts provided to a user of a mobile device based on context of the mobile device. For example, a perimeter of a geo fence can be decreased when the mobile device enters a particular context (such as when the user is traveling on a train), thereby decreasing unwanted alerts. As another example, certain alerts can be dynamically turned on based on the device entering a specified context (e.g., a particular application being executed or the mobile device is being carried by the user as the user is running), thereby allowing the user to receive alerts that he/she would not have otherwise received.

25 Claims, 9 Drawing Sheets

MANAGING ALERTS BASED ON CONTEXT

CROSS-REFERENCE TO RELATED APPLICATIONS

The present application claims priority from and is a non-provisional application of U.S. Provisional Application No. 61/655,956, entitled "MANAGING ALERTS BASED ON CONTEXT" filed Jun. 5, 2012, the entire contents of which are herein incorporated by reference for all purposes.

BACKGROUND

The present disclosure generally relates to providing alerts and search results to users, and more specifically to managing location-based alerts and search results based on context.

Mobile devices often have the ability to determine the location of the device. This ability has allowed alerts to be provided to a user of a mobile device based on the location of the mobile device. Typically, an alert is triggered when the mobile device is close to a particular location, e.g., crosses a geo-fence that surrounds the location. However, this basic paradigm of location-based alerts can suffer drawbacks of unwanted and excessive alerts or missed alerts.

Additionally, a user is required to specifically define a geo-fence for a particular location. Such a requirement for the user to perform an overt act limits the usefulness that location-based alerts can provide. Current implementations also have other drawbacks.

It is therefore desirable to provide methods and systems for managing location-based alerts.

BRIEF SUMMARY

Embodiments can provide systems and methods for managing alerts provided to a user of a mobile device based on context of the mobile device. For example, a perimeter of a geo-fence can be decreased when the mobile device enters a particular context (such as when the user is traveling on a train), thereby decreasing unwanted alerts. As another example, certain alerts can be dynamically turned on based on the device entering a specified context (e.g., a particular application being executed or the mobile device is being carried by the user as the user is running), thereby allowing the user to receive alerts that he/she would not have otherwise received.

According to one embodiment, a method manages location-based alerts to a user of a mobile device. An electronic device receives instructions to provide a geo-fence around a location. The geo-fence has a perimeter that can change (i.e., is variable). An alert is output from the mobile device when the mobile device crosses a current perimeter of the geo-fence. The electronic device establishes the perimeter of the geo-fence to have a default size in response to receiving the instructions. The electronic device detects a change in a context of the mobile device to a first context. For example, the change is from a default context to the first context. The electronic device decreases the perimeter of the geo-fence to have a second size that is smaller than the default size in response to the change of the mobile device to the first context.

According to another embodiment, a method manages location-based alerts to a user of a mobile device. An electronic device receives instructions to assign a respective geofence to each of plurality of locations. Each geo-fence has a perimeter that is variable. An alert is output from the mobile device when the mobile device crosses a current perimeter of a geo fence. The electronic device sets the perimeters of the geo-fences to have respective first sizes. The electronic device detects a change in a context of the mobile device. In response to the change in the context of the mobile device, the perimeter of a first geo-fence is changed to have a second size that is different than the respective first size of the first geo-fence, and the perimeter of a second geo-fence is kept at the respective first size of the second geo-fence.

According to one embodiment, a method provides search results to a user of a mobile device. An electronic device (e.g., the mobile device or a server communicably coupled to the mobile device) receives one or more search terms and one or more urgency terms. A query is submitted based on the one or more search terms to obtain a plurality of location sites corresponding to the query. The electronic device analyzes the location sites based on the urgency terms. A subset of the plurality of location sites are identified based on the analysis. The subset of location sites are then provided to the user of the mobile device.

Other embodiments are directed to systems, portable consumer devices, and computer readable media associated with methods described herein.

A better understanding of the nature and advantages of the present invention may be gained with reference to the following detailed description and the accompanying drawings.

DEFINITIONS

The "context" is a state of the mobile device and can refer to an operation of the mobile device or an environmental state of the mobile device. The environmental state could be that the mobile device is on public transportation, which can be inferred from location information. The location information could be coupled with other information, such as use of the mobile phone for payment of a fare. The operation of the device can relate to a particular application being executed. Factors of context can include speed of travel, mode of transportation (e.g., car or train as determined using one or more factors), and recent queries made to an application, e.g., a search application.

The "default size" of a perimeter of a geo-fence is used when a geo-fence is first established. As examples, the default size may be defined as a circle of a specified radius around the location (e.g. a radius of 100 meters), a set of points at specified distances in various directions, or any other shape defined by default values. In one embodiment, the default size is not based on a particular context of a mobile device that is assigned to the geo-fence.

DETAILED DESCRIPTION

Always having location-based alerts fully active can cause unwanted alerts. Additionally, requiring a user to take specific steps to create a particular geo-fence provides limited usefulness. Embodiments can provide systems and methods for managing alerts provided to a user of a mobile device based on context of the mobile device. For example, a perimeter of a geo-fence can be decreased when the mobile device enters a particular context (such as when the user is traveling on a train), thereby decreasing unwanted alerts. As another example, certain alerts can be dynamically turned on based on the device entering a specified context (e.g., a particular application being executed or the mobile device is being carried by the user as the user is running), thereby allowing the user to receive alerts that he/she would not have otherwise received.

Accordingly, some embodiments can reduce the amount of noise from alerts that are unwanted. This can be done by turning off geo-fences when a particular context occurs, or only turning on a geo-fence when a particular context is entered. Some embodiments can also increase the chances that a geo-fence is encountered when there is urgency, e.g., an alert has been pending for 1 week (e.g., get milk), and thus the geo-fence should get bigger. Urgency can also be accounted for in a search by a user. For example, the location sites matching the search can be filtered based on one or more qualifying words (such as "right now" or "immediately" for high urgency or words associated with less urgency such as "convenient"). When a less urgent term is used, embodiments can select a matching location site that is not out of the way (e.g., along the current route), where a high urgency term can return only the location site that is closest.

I. Geo-Fences

Figure 1A:
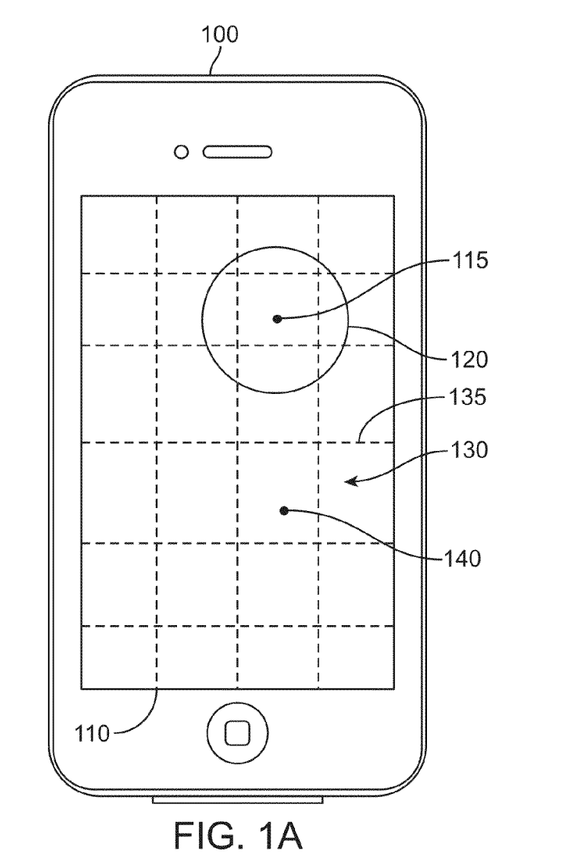
FIG. 1A shows a mobile device displaying a geo-fence around a location.

FIG. 1A shows a mobile device 100 (e.g., a smartphone) displaying a geo-fence 120 around a location 115. Display 110 of mobile device 100 is shown displaying a view 130 of a map application for illustration purposes. The location of the mobile device is shown as location 140. View 130 is provided to illustrate an applicability of geo-fence 120, and is not needed for operation of the geo-fence. Grid lines 135 can signify different map tiles for displaying the selected part of a map, and can signify distances. Grid lines 135 may be shown or hidden in the map.

Location 115 may be a store, a residence (e.g., the user's home), or any other identifiable location (also referred to as location sites). The user can specify location 115 through speech, gestures, keyboard, touch screen, or other user input. Location 115 can be one of several locations identified by a single input, e.g., a user input of any location where a grocery store exists.

Geo-fence 120 is shown as a circle centered at location 115, with the circle acting as a perimeter around location 115. After the user specifies that a geo-fence should be set up around location 115, the perimeter is established at a default size, e.g., a particular radius. In various embodiments, the default size can be set by the user, or be set at a common radius for all geo-fences.

When the location of the mobile device crosses the perimeter of geo-fence an alert is sent to the user. For example, a vibrational, audio, and/or visual cue can be provided. The event of crossing the perimeter acts as a trigger of the alert.

In other embodiments, a geo-fence can be defined as a traveling time or distance to a location site. For example, if one is traveling by car on a freeway, the route to get to a particular location site would be longer than a direct geographic line to the location site. The geo-fence can operate to trigger based on such a distance or time. The exact trigger points can be defined by specific positions along the road network, e.g., each road in the vicinity can have a different trigger point defined. Thus, each trigger position on the road network can vary independently of the trigger positions for other roads (e.g., not a single radius defining the trigger points for all roads). The current traffic conditions can be used to determine a traveling time. In other embodiments, the traveling time can use the current speed of the mobile device and/or posted speed limits. Thus, the time to travel to a location can be used as opposed to distance in a straight line. The time can account for traffic and the specific path along the roads that would be needed, e.g., a user would need to pass the location, take an exit off the freeway, and then double back. In this manner, a total distance of the actual path to a location site can be used.

Figure 1B:
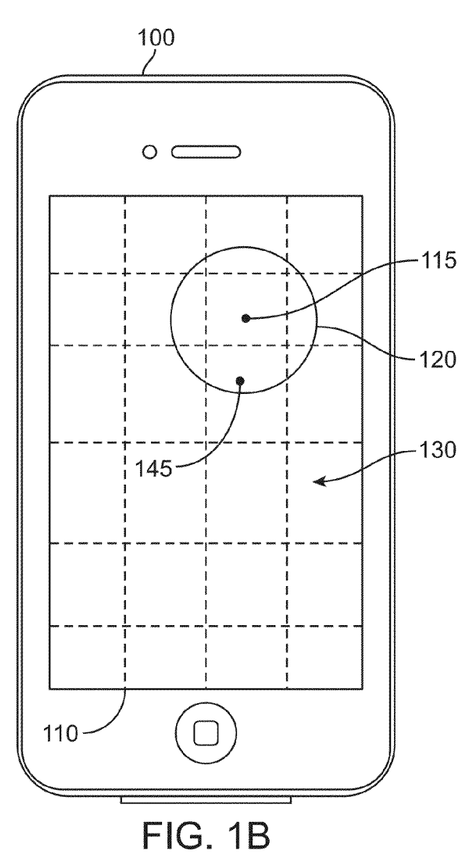
FIG. 1B shows the location of the mobile device within the perimeter of geo-fence.

FIG. 1B shows the location 145 of the mobile device within the perimeter of geo-fence 120. Thus, an alert would have been provided to the user of the mobile device 100. The alert can provide specific information, such as a message that is displayed or spoken. The determination that the mobile device has crossed a perimeter of a geo-fence can be determined at the mobile device (e.g., the mobile device stores the geo-fence) or determined at a server, which can then communicate the alert to the mobile device for outputting the alert to the user. Embodiments can have the perimeter of a geo-fence be of variable size, and the variable size can depend on a context of the mobile device.

II. Contexts

The context of a mobile device relates to some state that the mobile device is in. Examples of states include an environmental state, such a location of the mobile device, a mode of transportation for the mobile device (where the location information can help to determine the mode of transportation) and an operation of the mobile device (e.g. a particular application being executed on the mobile device). The information for determining a context of the mobile device can be gathered from a plurality of sensors, which can include hardware and/or software sensors. Such sensors can determine, for example, specific applications running on a processor of the mobile device, past search queries (including certain search terms) to a map application or other application, location of the mobile device, orientation of the mobile device, and information sent from a server, which can also be used to determine a context of the mobile device. A particular context can be a particular combination of different state variables as determined from information from the sensors. The mobile device can have multiple contexts, where each context can cause different geo-fences to change. The context can be determined by the mobile phone, by a server, or a combination of the two.

Figure 2A:
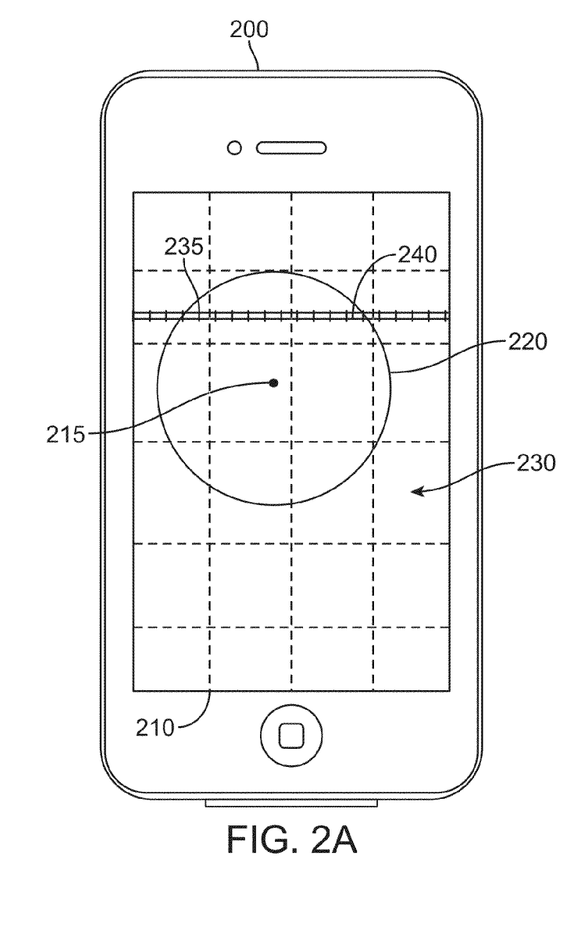
FIG. 2A shows a mobile device displaying a geo-fence around a location.

FIG. 2A shows a mobile device 200 displaying a geo-fence 220 around a location site 215. The location of mobile device 200 is shown as location 240. Location 240 is on a set of train tracks 235. Thus, in this example, the user is traveling on a train, and the context of the mobile device is: mode of transportation equals train. The fact that the user is on a train can be determined from knowledge of where the train tracks are at (a server or the mobile device itself can store locations of train tracks), along with the knowledge of location 240, which may be determined in various ways, as described herein. Additionally, the location information could be coupled with other information, such as use of the mobile phone for payment of a fare. Any information gathered about the phone can be used to determine the context, such as speed of travel and recent queries made to a map application or other application.

As location 240 of mobile device 200 falls within the perimeter of geo-fence 220, an alert would be sent to the user of mobile device 200 when the perimeter is crossed. However, since the user is on a train, as opposed to car, the user cannot easily change course in case he/she wants to go to location site 215. Thus, the alert is an unwanted alert due to the context of the mobile device being on a train. Embodiments can prevent this unwanted alert, as is described below, but first some other examples of contexts and how they may be determined is described.

As mentioned above, the context can be determined from location. The mobile device can store a road network or be in communication with a server that stores the road network. The location of the mobile device can then be used to identify that the mobile device (and thus the user) is traveling in a car along a particular road. The determination may be made entirely or in part by the server and then communicated to the mobile device. Besides a road network, the location of train tracks can be stored and one or more determined locations of the mobile device can be cross-referenced against the train tracks. If the mobile device temporarily stops at known train stations, such a correlation can also be used to identify the train as the mode of transportation. A context could be broader and include any form of public transportation. Also, if the mode of transportation (e.g., a boat) has a Wi-Fi connection, the origin of that connection (e.g., an IP address) can be associated with a particular transport (e.g., the boat), and thus used to determine the mode of transportation.

The context can also include a purpose of the travel, which can be inferred, e.g., based on patterns. A purpose can be the commute to work. If the mobile device is determined to be going to and from a location site at typical commute times, the location site can be inferred as a work location. Such a context of commuting can be used to reduce or remove unwanted alerts during a commute. Thus, the state of traveling on public transportation may be coupled with knowledge that the user travels the same route every day during rush hour. The context also may be based on whether a stop is near a particular location. In that instance, one geo-fence near the stop may change differently than other geo-fences.

III. Reducing Perimeter of Geo-Fences

Embodiments can prevent this unwanted alert of the example in FIG. 2A. For example, the perimeter of the geofence can be decreased when the user in the context of traveling on the train. The decrease can be of such an extent that the mobile device cannot cross the perimeter when in this context of train travel. The decrease in the perimeter can effectively turn off the geo-fence. For example, if the geo-fence is deactivated, the perimeter is effectively at a zero size.

Figure 2B:
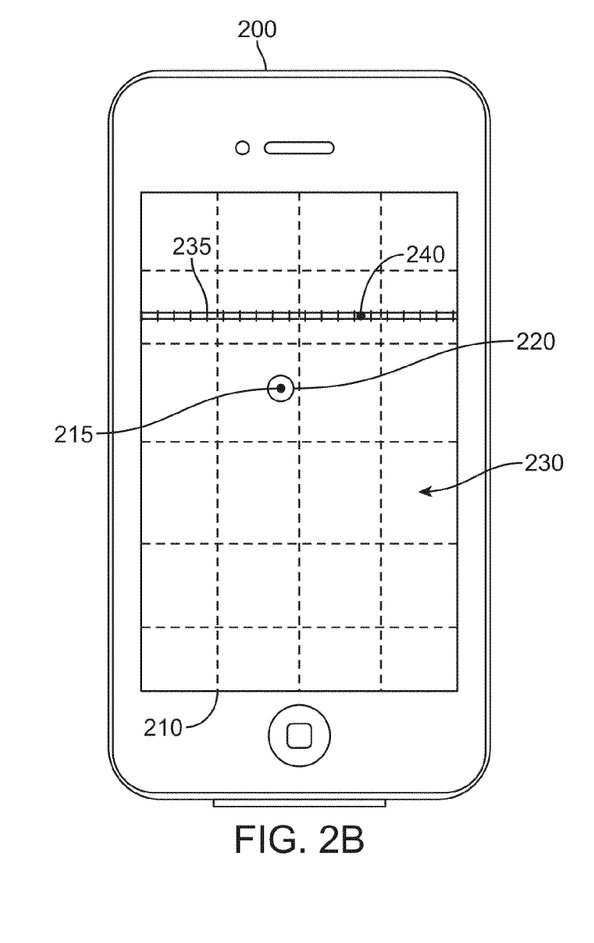
FIG. 2B shows the example of FIG. 2A, but where the geo-fence is decreased in size according to embodiments of the present invention.

FIG. 2B shows the example of FIG. 2A, but where the geo-fence 220 is decreased in size according to embodiments of the present invention. Since the context was determined to be a mode of transportation being a train (e.g., as determined by the mobile device or a server in communication with the mobile device), the perimeter of geo-fence 220 was reduced in size. The size of the perimeter can be reduced in various ways, and the shape of the perimeter can change. This reduction in size can be automatically performed by the mobile device and/or server when a change to the given context was identified. In another embodiment, a user can specify the decrease in size when the mobile device enters a particular context. For example, the user could mark a perimeter so that it does not cross the train tracks, where that perimeter is used when a context includes the mode of transportation of a train.

Figure 3:
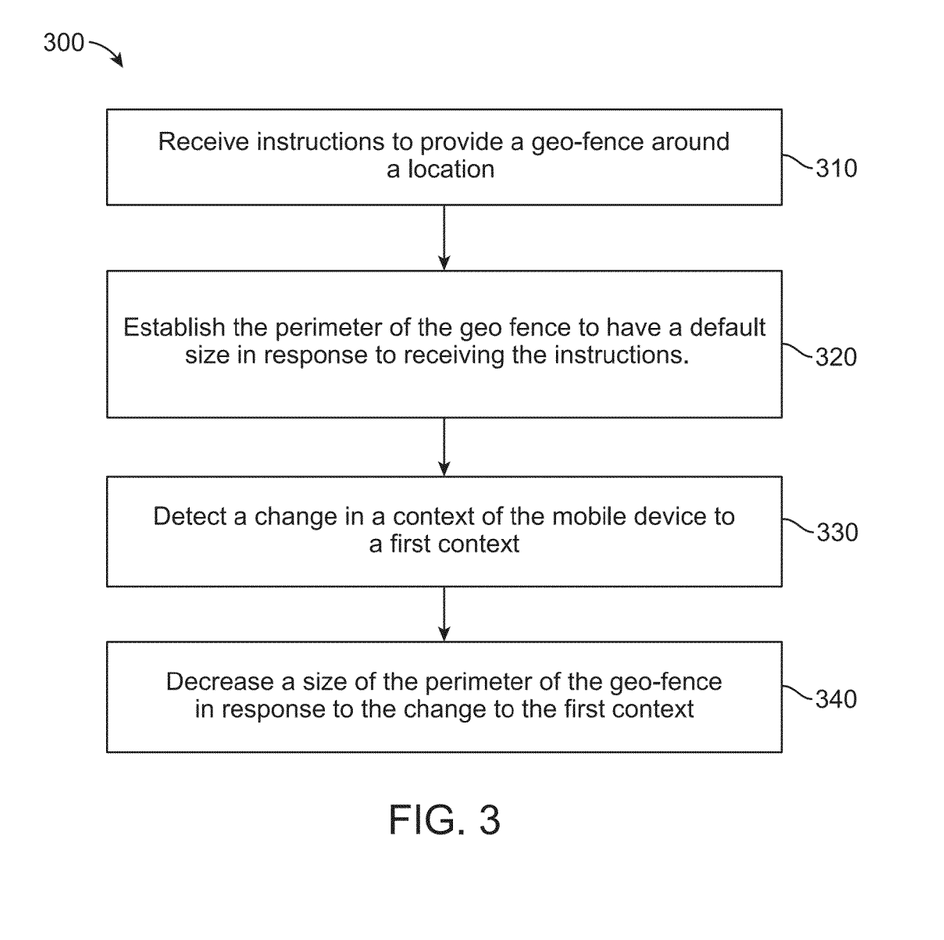
FIG. 3 is a flowchart of a method of managing location-based alerts to a user of a mobile device according to embodiments of the present invention.

FIG. 3 is a flowchart of a method 300 of managing location-based alerts to a user of a mobile device. Method 300 can be performed wholly or partially by a mobile device or a server in communication with the mobile device, e.g., as is shown in later figures. Method 300 can reduce unwanted alerts by reducing a perimeter of a geo-fence when the mobile device has a particular context.

At block 310, instructions to provide a geo-fence around a location are received by an electronic device (e.g., the mobile device and/or a server communicably coupled to the mobile device). The instructions may be provided by a user to the mobile device, e.g., by voice commands, gestures detected by a camera, or by physical input as may be provided on a touch screen. The instructions can be forwarded to a server for creating and storing the geo-fence, or may be used by the mobile device. As detailed above, the geo-fence has a perimeter that is variable (i.e. the perimeter can change). An alert is output from the mobile device when the mobile device crosses a current perimeter of the geo-fence.

In one embodiment, the instructions could be for a particular store. In another embodiment, the mobile device can query a server to identify all of the locations of that store (at least within a certain vicinity) and a geo-fence can be provided around all or selected locations corresponding to the query. For example, the instructions can be "remind me to pick up milk at the grocery store." The query of milk can be provided to the server, which can cross-reference retail listings for grocery stores, or other types of stores that are listed as selling milk (the listing may identify a broader category than milk, such as groceries).

At block 320, in response to receiving the instructions, the perimeter of the geo-fence is established to have a default size by the electronic device. The default size can be the same for all geo-fences when they are first created. In another embodiment, the user can set the default size for a particular type of geo-fence (e.g., for a geo-fence around the user's home or other residential location, or for all commercial locations). In one implementation, the default size can be independent of a context of a current context of the mobile device. This default size can be established for various lengths of time, e.g., just for a few seconds, for minutes, for hours, or for days. While the default size is being used for the perimeter of the geo-fence, an alert is output from the mobile device when the mobile device crosses the default perimeter. The perimeter can be established by the mobile device or the server.

At block 330, a change in a context of the mobile device to a first context is detected by the electronic device. The change can be detected as a result of changes in information collected from the sensors of the mobile device. For example, a location detector can provide new location information, which can lead to a new context being detected. The sensor information can be analyzed by a processor of the mobile device and/or by a processor of a server in communication with the mobile device.

At block 340, in response to the change of the mobile device to the first context, the perimeter of the geo-fence is decreased to have a second size that is smaller than the default size. A size of the perimeter can change in various ways, and can be considered a transform of the perimeter. As shown in FIG. 2B, the transformation can be a decrease in a radius of a circle centered at the location. Other examples are turning off a geo-fence or changing the shape of a geo-fence. For example, the perimeter can change from a circle to an ellipse, where the part of the ellipse that extends to train tracks 235 is smaller than the radius of the circle used for the default perimeter.

The change in context to the first context can affect all of the geo-fences for the mobile device, or just a selected number of geo-fences. For example, in response to the change of the mobile device to the first context, all of the perimeters of the geo-fences established for the mobile device can be reduced. In one embodiment, if the context of the mobile device is detected to have changed so that it is no longer the first context (e.g., first context is no longer valid), the perimeter can be increased to have the default size or some other larger size relative to the second size. The increase can be in response in response to detecting that the first context is no longer valid.

The perimeter of the geo-fence can be decreased to a predetermined size, which could be the same for all geo-fences or the same for just a subset of geo-fences. For example, if the context is being on public transportation, the decrease can always be to zero or some other relatively small predetermined size from the default size. As another example, the decrease can depend on what the first context is, but otherwise always be the same when the mobile device enters the first context. In other embodiments, the amount of decrease can vary based on dynamic information, which may be obtained from sensors of the mobile device or a server.

IV. Changing Geo-Fences Independently of Each Other

Besides reducing a size of the geo-fence, different geo-fences can be changed independently of each other based on a context of the mobile device. The dynamic change can result in specific geo-fences being turned on when the mobile device enters a particular context. The perimeters of the specific geo-fences can change in size in any manner, besides being turned of and on.

A. Dynamically Turning on Geo-Fences

Figure 4A:
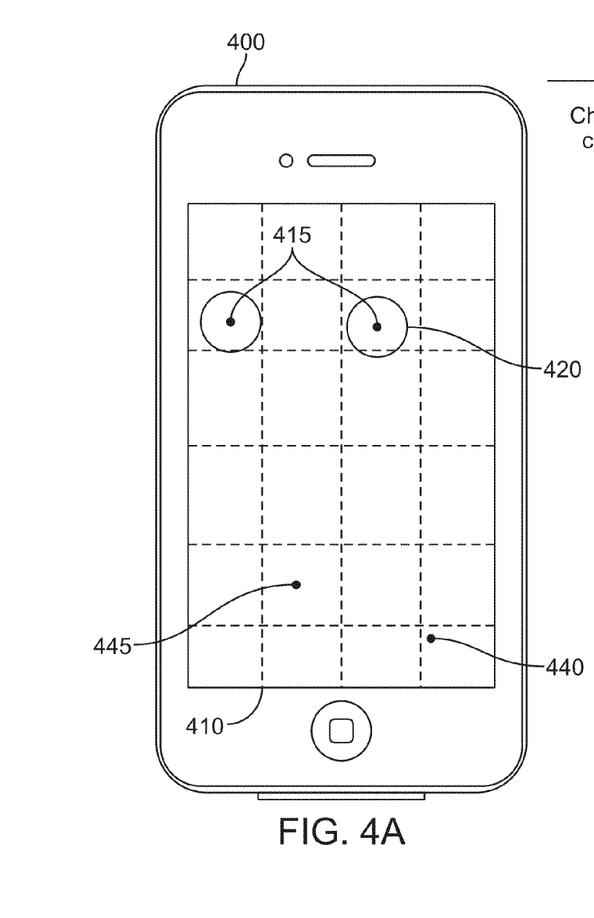
FIG. 4A shows a mobile device displaying geo-fences around two locations on a display, and no geo-fence around a third location.

FIG. 4A shows a mobile device 400 displaying geo-fences around two location sites 415 on a display 410, and no geo-fence around a third location site 445. The location of mobile device 400 is shown as location 440. Location sites 415 have geo-fences with respective perimeters 420. Location site 445 currently does not have a geo-fence. As with other geo-fences, the mobile device does not need to (and may be configured not to) display the geo-fences for the geo-fences to function. The geo-fences are shown on the mobile device for purely illustrative purposes.

Figure 4B:
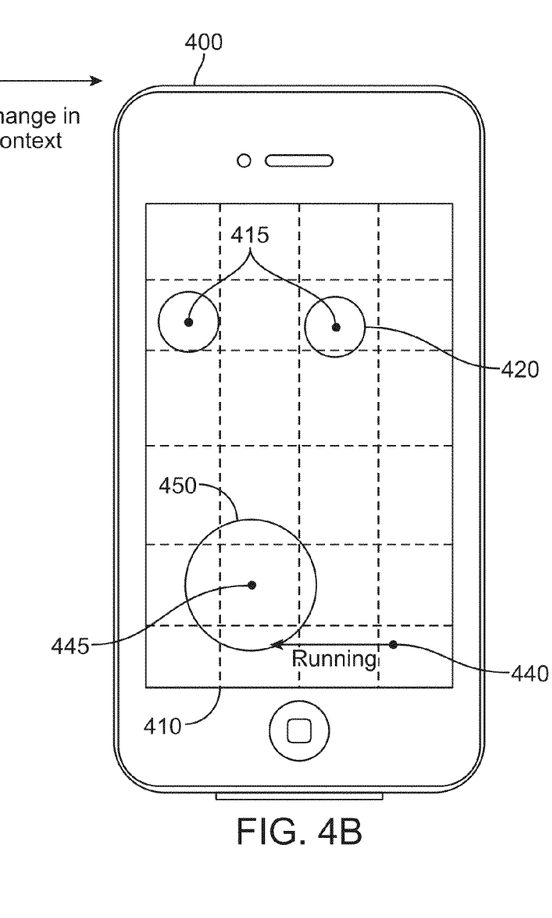
FIG. 4B shows mobile device displaying geo-fences around all three locations.

FIG. 4B shows mobile device 400 displaying geo-fences around all three location sites. A geo-fence 450 is now shown around location site 445. In this example, the creation of geo-fence 450 is the result of the mobile device changing a context to being carried by the user who is running. The user could be identified as running based on the speed of the mobile device (e.g., as determined from changes in the measured locations as determined by a location detector in the mobile device).

Location site 445 can be associated with the context of running, and thus its geo-fence is turned on when the context of the mobile device changes to running. Such locations could be a park and stores that sell healthy food or running gear. As shown, the mobile device eventually crosses the perimeter of geo-fence 450, which triggers an alert. The alert could be provided in any manner. For example, if the user looks at a map, the location 445 might automatically show up or be highlighted, which is a type of alert. Showing up when a person is viewing a map is less obtrusive, than if the alert is provided the alert via a ringtone or vibration. Plus, if the user is looking at the map, then the user is in a mode of looking for a location. In this example, the context can further include that the user is looking at a map, and then at that point the geo-fence could be turned on and the alert provided visually on the map. Note even if the user stops momentarily to look at the context, the context may not immediately leave the context of running. For example, before a context is determined to have changed, a time limit can be required (i.e., the new context can be required to exist for a minimum duration before the running context is deemed to no longer be valid).

Another example is if a user is listening to music, then one or more geo-fences could be turned on for music stores or particular urban clothing stores. The alert could show up when someone is using a map application, even though a search for such stores was not provided.

In one embodiment, a user can specify what types of location sites that the user would be interested in being turned on. In this manner, not all possible geo-fences would be turned on every time the mobile device enters a corresponding context. In various embodiments, the user can specify the type of retail establishments that alerts can be turned on for, how the alerts will be provided (e.g., only in a map, by visual message only, by audio, etc.), and date/times for when geo-fences can be turned on.

B. Changing Perimeter of Geo-Fences

Figure 5:
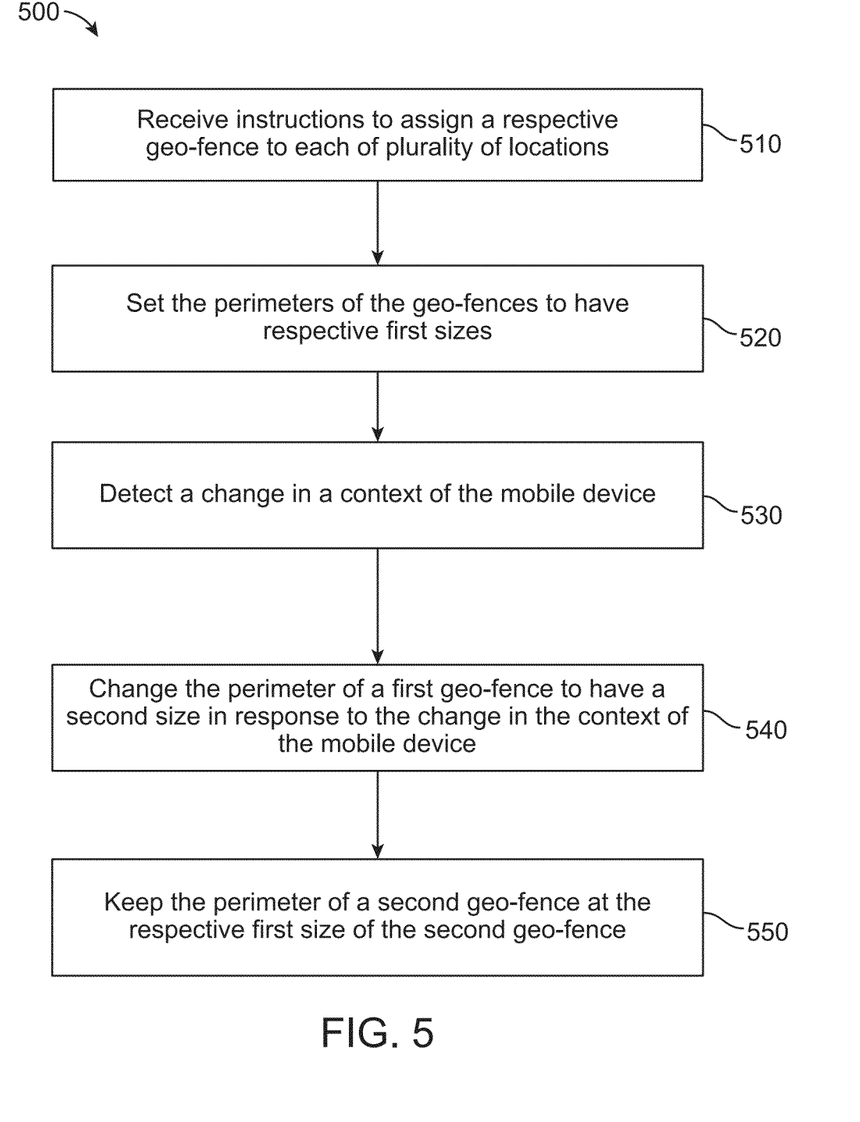
FIG. 5 is a flowchart of a method of managing location-based alerts to a user of a mobile device according to embodiments of the present invention.

FIG. 5 is a flowchart of a method 500 of managing location-based alerts to a user of a mobile device. As with other methods described herein, method 500 can be performed wholly or partially by an electronic device, such as the mobile device or a server in communication with the mobile device, e.g., as is shown in later figures.

At block 510, instructions are received to assign a respective geo-fence to each of plurality of locations. The instructions can be received at the mobile device or a server in communication with the mobile device. Each of these geo-fences have a perimeter that is variable. In one aspect, an alert is output from the mobile device when the mobile device crosses a current perimeter of a geo-fence.

The instructions can be provided at a plurality of times. For example, the instructions to assign a first geo-fence to a first location can be received one day, and the instructions to assign a second geo-fence to a second location can be received another day. The instructions can be provided by the user for a specific location. In another embodiment, the mobile device and/or a server can initiate the instructions, which can be based on a general request from the user to receive alerts.

At block 520, the perimeters of the geo-fences are set to have respective first sizes. If the first size of a first perimeter of a first geo-fence is zero in all dimensions, then the first geo-fence can be considered as being off. In one embodiment, all of the respective first sizes are the same. In another embodiment, some of the respective first sizes can differ. In one implementation, the user can specify the first size for some or all of the geo-fences, or the size can be determined by a value stored in the mobile device or the server. The specification of the first size by the user can be received via a voice command. The respective first size can be determined based on an urgency of the words used in the voice command, e.g., use of "small" or "large" to define predetermined sizes of the perimeters.

At block 530, a change is detected in a context of the mobile device. The change can be detected as described herein. For example, a processor of the mobile device can collect information periodically from one or more hardware and/or software sensors, and use these values to determine a context. The sensor information (e.g., location information or information about the operation of the mobile device) can be sent to a server to analyze and determine the current context of the mobile device, or the mobile device can determine the current context. The mobile device can have multiple contexts, where each context can cause different geo-fences to change. For example, one context can relate to a movement of the mobile device and another context can relate to a particular application being execute on the mobile device. The sensor information can also be combined to create a third context as a combination of these two contexts. The term sensor does not have to be a dedicated hardware, but can include software that collects data.

At block 540, in response to the change in the context of the mobile device, the perimeter of a first geo-fence is changed to have a second size that is different than the respective first size of the first geo-fence. For example, if a geo-fence 1 was previously set to have a first size of zero in all dimensions (e.g., all parameters defining the perimeter of the geo-fence), then the second size would be non-zero in at least one dimension, thereby turning geo-fence 1 on. The geo-fence 450 of FIG. 4B is such an example. The change can be any change in size, e.g., increases, decreases, changes in shape, etc., including turning off the geo-fence by reducing the perimeter to zero.

The instructions to create the first geo-fence can include a condition, where the condition is that the mobile device has a first context. Thus, the instructions are for a creation of a non-zero perimeter when the condition is satisfied. The condition can define the criteria for identifying the first context (e.g., the values for the sensor information to determine that the mobile device is in the first context); the condition would be satisfied when the mobile device enters the first context.

At block 550, in response to the change in the context of the mobile device, the perimeter of a second geo-fence is kept at the respective first size of the second geo-fence. The geo-fences 420 shown in FIG. 4B is such an example. These geo-fences are not affected by the change in the context of the mobile device.

As mentioned above, the change in the perimeter of the first geo-fence can occur in various ways. For example, the change to the second size can cause an asymmetric change in a shape of the perimeter of the first geo-fence. An example of a change (transform) would be for a square to go to a parallelogram, or a circle into a cone. The transform could be based on underlying geographical features, such as a shoreline, a mountain, a park, or a cliff, or even a road network.

The change in the context of the mobile device can occur as a result of an elapsed time since establishing the first geo-fence without the mobile device crossing a threshold, and potentially completing a task. For example, if a geo-fence is established on a first day, then the context might be that the alert was not triggered and satisfied (e.g., an alert for picking up milk had not been received, completed, and dismissed by a user) by a seventh day (or other threshold time limit). In such a case, the perimeter of the geo-fence can increase in an effort to get the alert triggered. In another embodiment, the change in the context of the mobile device occurs as a result of a first application being executed on a processor of the mobile device.

The change of a perimeter could be based on speed of travel. In such an instance, only certain geo-fences would change. For example, a user may be able to specify perimeters that are variable or not variable. A condition might occur for a geo-fence to switch to variable perimeters, such as based on an elapsed time since the geo-fence was created. The speed of travel could be used to provide notifications earlier when the speed is faster, thereby providing the alert in time for the user to react.

C Other Context Examples

Another context can include a prediction of a particular route being taken. For example, if someone is running and the location of the person's house is known to be on a path that passes near a particular location, the mobile device (and/or server) can assume that the user will travel along that path, is likely to travel along that path, or at least that the path is not out of the way. An alert can then be sent at a more opportune time, or be sent when otherwise the alert might not have been sent (e.g., the user went along a different path). In another example, the person could have specified a route, and it can be assumed that the user is on the route (e.g., if a start button is hit or the locations align with the route). A route can also be inferred based on a location of the user's home or other frequently visited location. In such instances, alerts can be sent more in advance (e.g., regardless of speed). Thus, a geo-fence can be enlarged based on a context of a particular route being taken.

Another example is if the user is stopped. In such an occurrence it may be convenient for the user to go to stores in the vicinity. Thus, geo-fences might be turned on if the user is stopped (e.g., at a gas station). Or, the geo-fences might be increased for stores that are near the user, when the mobile device is stopped. Yet another example of context could be the direction of movement. If the device is moving in a direction that would intersect with the geo-fence, then the perimeter might be allowed to grow, whereas the perimeter might not grow when the mobile device is moving fast, but in a direction tangential to or away from the perimeter.

As yet another example, a geo-fence can be increase when a route of travel is known or can be inferred. For instance, the context could take into account where the person lives, and know that a particular location site is on the way home. The alert could be provided at a sooner time (e.g., an increase in the perimeter) as it can be assumed that the user will travel in that direction.

The location site itself could also be mobile, e.g., if the location site was a food truck. In such as case, both directions of movement could be taken into account. For instance, if the location is another mobile device (e.g., of a friend), then the geo-fence could increase if both are walking toward each other. The alert could be for a reminder to talk to your friend about an upcoming trip together. Another context could be both are on vacation (e.g., away from home), then the perimeter might also increase regardless of movement, as the relative proximity is great compared to the distance from home. Whereas at work, the perimeter could be 50 feet.

V. Detecting Trigger

If there are numerous geo-fences determining when any trigger is activated can be intensive. In one embodiment, a culling of locations that are within a vicinity of the mobile device (e.g., within a specified distance of the mobile device) can be identified, and then these geo-fences can be monitored periodically to determine if the corresponding perimeter is crossed. For example, if the user is walking, then all of the tracked location that are greater than 2 miles would not be checked to see if they are activated. The area of locations to check for geo-fence crossing can be within a common area of movement, e.g., around the user's home and work. If the user travels outside of these common areas, then the locations can be updated (e.g., travel to New York from San Francisco).

The checking of geo-fences for location sites can be performed on a periodic basis, and can take into account the energy level on the battery. If the battery is being charged then the position can be checked frequently, compared to being run on the battery. If the battery is below a threshold, then the checking can be reduced more, and so on, with multiple levels of activity of checking position based on varying battery levels.

In another embodiment, a brute force method can be used by the processor for checking whether a geo-fence is crossed. The processor can scan through all of the currently active geo-fences, and can be done on a periodic basis. The location sites for checking could be identified when the geo-fence was created. For example, if the location site is for a store, each location of a store within a certain radius of the user's home or where the user is at when the geo-fence is first created can be identified and stored. The location sites can be updated though, e.g., to catch when a particular branch of a store closes.

As mentioned herein, checking for whether any of the fences have been crossed can be done by a server in communication with the mobile device. The checks can be performed on a periodic basis. For example, the alerts can be performed by having running searches in the cloud, where the server periodically checks to see if any conditions are met.

VI. Manner of Providing Alert

The alerts can provide cues of audio, vibrational, and/or visual. For example, an alarm or ringtone can go off, and a message can appear automatically when a geo-fence is crossed. An alert can be provided based on other criteria besides or in addition to crossing a perimeter of a geo-fence. For example, an alert can be provided when a user views a map. The locations with geo-fences that got turned on can be highlighted. The locations can also be ranked, which can be shown via any indicia, e.g., color-coded, brighter, or numerical rank (a higher rank can show relevance based on context). For example, the identification of certain location may only be shown when the user views a map, even if for a different purpose than to see alerts. The location could be identified with a pin or highlighted in other ways.

Figure 6A:
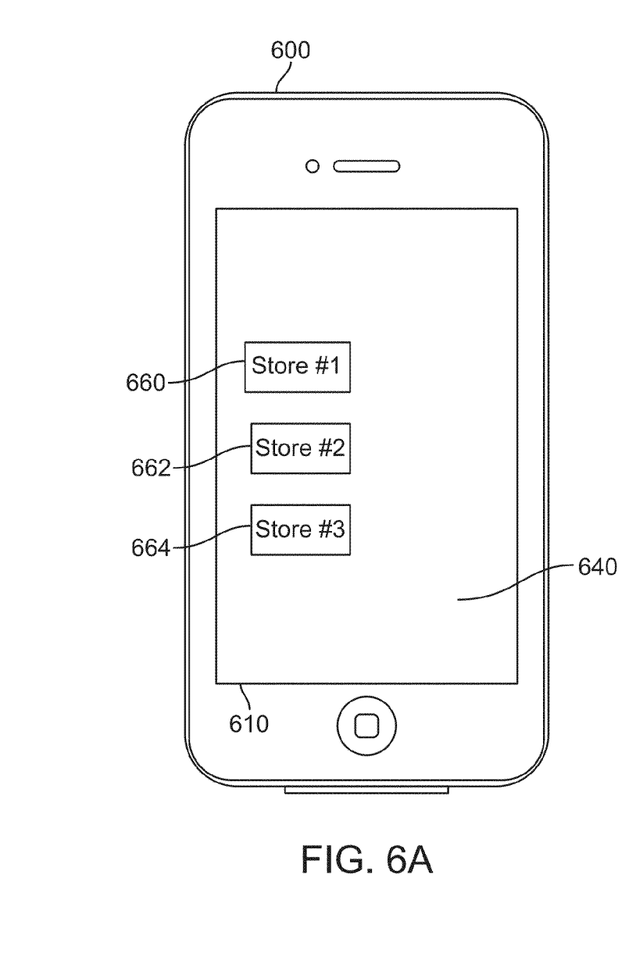
FIG. 6A shows a mobile device displaying stores on a display relative to location of the mobile device.

FIG. 6A shows a mobile device 600 displaying stores 660, 662, and 664 on a display 610 relative to location 640 of the mobile device. As shown, all of the stores 660-664 are of equal size and do not have any distinguishing characteristics between them. Thus, based on the current context there is not particular alert associated with the stores.

Figure 6B:
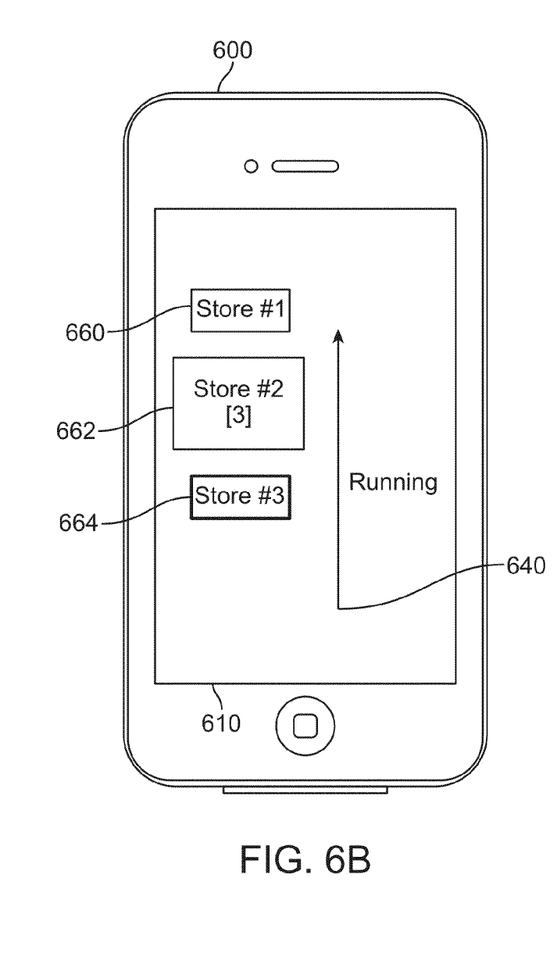
FIG. 6B shows mobile device displaying stores on a display relative to location of the mobile device with varying levels of highlighting.

FIG. 6B shows mobile device 600 displaying stores 660-664 on a display 610 relative to location 640 of the mobile device with varying levels of highlighting. In the example shown, the context is the mobile device being carried by the user as he/she is running. In this context, certain stores have associated alerts that are implicated, and thus these stores are emphasized. Store 662 is enlarged, which can be a sign that this store is associated with the context of running. The number of items (or tasks) to be performed at store 662 is listed as "3". Another type of emphasis is store 664, which is shown with a heavier outline. Alternatively, the size or outline of the other stores not implicated by the context can decrease.

Accordingly, for a map, certain objects in the map could be reduced in size and the more relevant locations could be highlighted. For example, when running, the location sites that are not relevant could be minimized (e.g., not displayed), and/or the location sites implicated by a current context could be expanded. A park could be highlighted (e.g., expanded) when the context is being carried while running. The highlighting on a map could be based on the context as well as the locations that are near, e.g., where the user is within the recently turned on geo-fences of the implicated location sites. The location sites highlighted could be generic to runners in general, or the user could provide input on the type of location sites to show up.

The alerts on a map can also provide a number of items associated with a particular location site. For example, the number of items might be the number of items to be purchased at the location. The number of items could be the number of overdue items, where overdue might be when an elapsed time is greater than a threshold.

The audio alerts can be a noise, or a digitized voice. The digitized voice could provide a suggestion about a location, and provide directions. In one embodiment, an alert can be an advertisement.

After providing an alert, the reminder could be set not to provide an alert for a predetermined amount of time. For example, if someone is traveling in the area near a perimeter, the device might cross the perimeter multiple times, and would not want to get an alert each time. In this manner, a user does not receive unwanted alerts. Alternatively, when the mobile device crosses a perimeter of a geo-fence for the first time, the geo-fence can be turned off.

VII. Providing Urgency of a Search

Embodiments are also applicable to searches performed on a mobile device. Search queries can often provide too many results. For example, if a user enters a search query (e.g., a search for gas or coffee while traveling in a car) into a map application, the number of returned items may be quite large. It is possible that the number of items is reduced by changing the area encompassed by viewable screen, thereby limiting the number of items provided. But, such a mechanism can miss desired items or still provide too many. Embodiments can use a context of the mobile device to filter out which ones are more relevant. Additionally, an urgency factor can be input by the user, e.g., via verbal commands.

Figure 7:
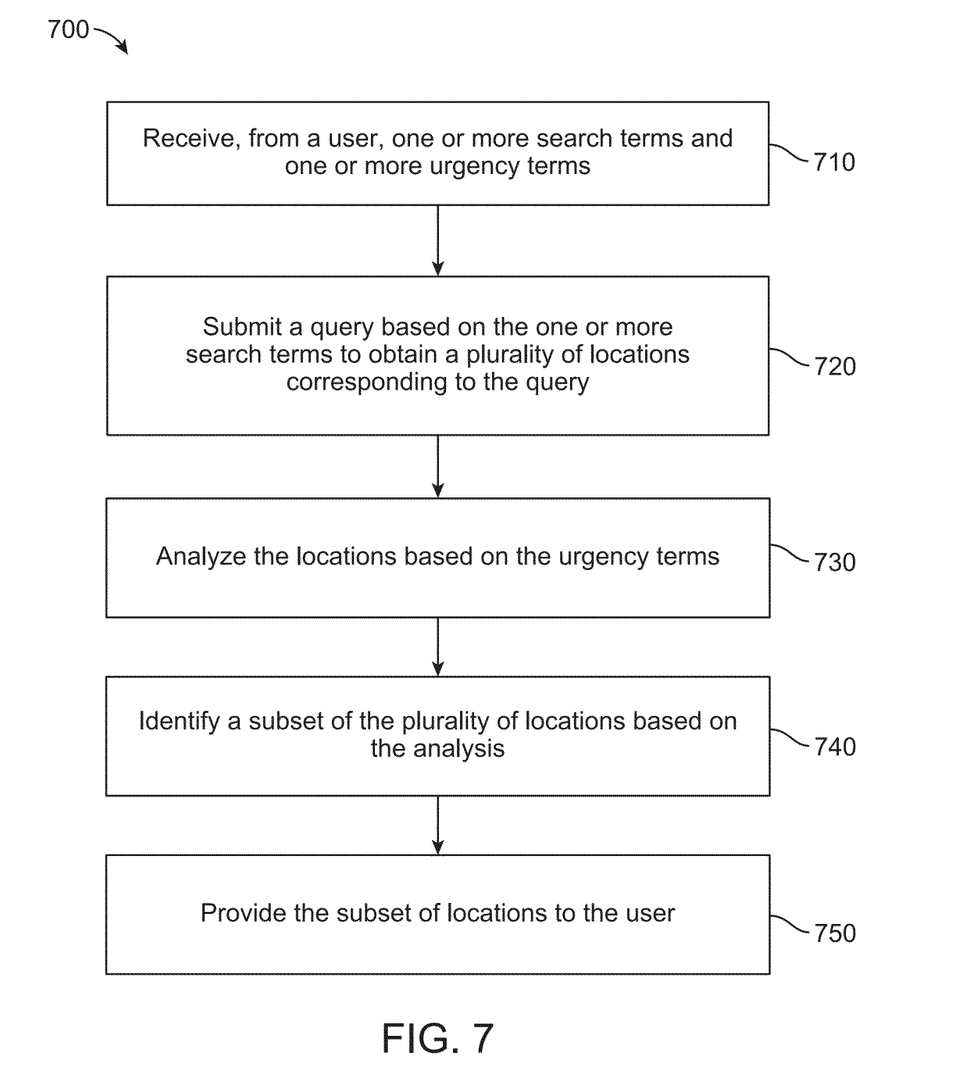
FIG. 7 is a flowchart illustrating a method of providing search results via a mobile device according to embodiments of the present invention.

FIG. 7 is a flowchart illustrating a method of providing search results to a user of a mobile device. Method 700 can be performed entirely or in part of the mobile device and/or a server communicably coupled with the mobile device. For example, the server can perform some parts of method 700 and the mobile device can perform the other parts, or each device can perform all of the steps.

At block 710, an electronic device (e.g., the mobile device and/or a server) receives from a user one or more search terms and one or more urgency terms. An example is "I need gas now," where the search term is "gas" and the urgency term is "now". Another example of an urgency term is "immediately". In this manner, only has stations that are close by distance and/or time, or fuel efficiency may be shown. A gas station is an example of a location site that matches the search term. Many location sites can match the search term, however, the urgency term is used to filter the matching location sites.

A user can also specify a lack of urgency with "take me along the scenic route" or "in the next hour". In this manner, location sites that are close to the route being traveled, but not necessarily close to the current location of the mobile device, can be chosen. Such terms are encompassed as an urgency term, as they express a level of urgency, even if the urgency level is low.

At block 720, a query is submitted based on the one or more search terms to obtain a plurality of location sites corresponding to the query. For example, the mobile device can submit a query to a server, which can contain a database for identifying matches to the search terms. When the electronic device is just the server, the server can generate the query for submitting to a database. The server can include the database and thus also execute the query to determine the location sites that match the query. The database can store various location sites as database objects, each with a set of field values associated with a location object (e.g., a store or landmark). The search terms can be compared against the field values to determine a match, and the matching location sites can be returned to the electronic device.

At block 730, the location sites are analyzed based on the urgency terms, specifically the locations of the location sites can be analyzed. The analysis can be used to determine which location sites fall within a certain window of distance or traveling time. Besides or in addition to the analysis based on the urgency terms, the analysis can be based on the context of the mobile device, e.g., which map application the mobile device is using to perform the query. For instance, if one is using a restaurant app, then the analysis can analyze a relationship of the location site to food, and certain location sites not related to food can be filtered out.

At block 740, a subset of the plurality of location sites can be identified based on the analysis. For example, the location sites that are within a certain distance or driving time (or other criteria-based window) of the mobile device can be selected. The size of the subset can vary based on the urgency term. If the urgency term is of only an intermediate level, then the number of location sites in the subset can be larger, depending on a differential (e.g., driving time or distance) between a current location of the mobile device and the location sites. The location sites that are included in the subset can be determined using a window (which may or may not include the mobile device, e.g., centered around the mobile device). The size and/shape of the window can at least partially be determined by the urgency terms. As mentioned above, other criteria can be used to determine the subset. For instance, if one is using a restaurant app, then only location sites that relate to food can be selected for the subset to be provided to the user, as long as the location site also satisfies the urgency-based analysis.

In one embodiment, a predetermined number of urgency levels can be set. When an urgency term is received, it can be allocated to one of the predetermined levels. For example, a term immediately would be assigned to a relatively high level (e.g., 8 of 10). A volume in the user's voice can also be accounted for, where a higher volume would increase the level of urgency. Each predetermined level of urgency can have predefined criteria for determining the subset (e.g., by using a window), such as a specific distance or time to get to a location site. The time to get to a location site can be based on a current speed of the mobile device and/or posted speed limits on the roads to get to the location site. Thus, after the one or more urgency terms are assigned to one of the predetermined urgency levels, the electronic device (mobile device or server) can determine a window (e.g., time-based or distance-based) using the criteria of the assigned level.

At block 750, the subset of location sites are provided to the user. A server can perform this step by sending the subset to the mobile device, e.g., sending only the subset or sending the subset with an indicator to differentiate from other location sites. The mobile device can perform this step by actually displaying or otherwise outputting (e.g., audio) the subset.

As examples, the location sites of the subset can be displayed on a map or provided via audio, e.g., cross streets or directions can be given. In one embodiment, one of the location sites is chosen as optimal and directions are provided to that location site, without the user needing to specify the location site. In this case, the subset can be just the one location site to which directions are provided.

Figure 8A:
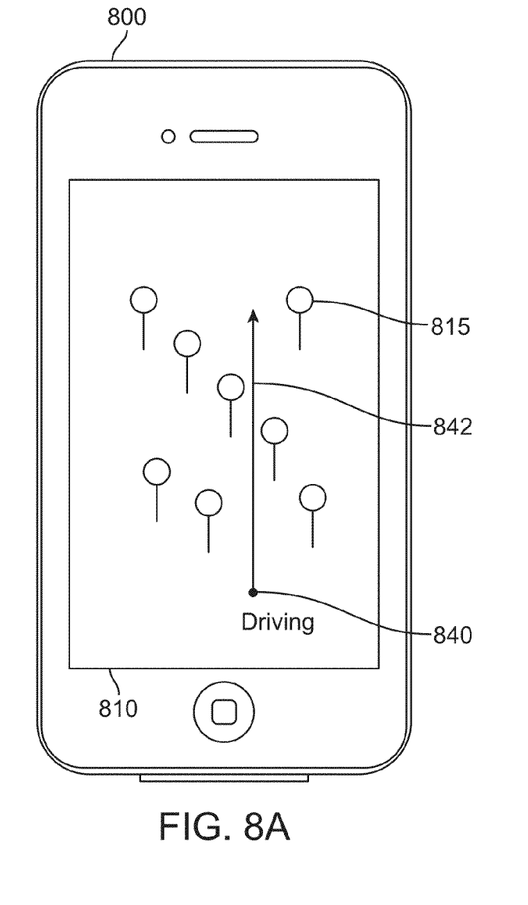
FIG. 8A shows a mobile device displaying a set of location sites matching search terms of a query and a location of the mobile device as the user is driving along route.

FIG. 8A shows a mobile device 800 displaying a set of location sites 815 on a display 810 that is also showing a location 840 of the mobile device as the user is driving along route 842. As shown, the number of resulting location sites is quite large. If the user was in a hurry, then she/he might spend in an inordinate amount of time trying to determine which location site to travel towards. Note that the user may be a passenger in a car and provide navigation. Or, a driver can provide voice commands, and a display can be on a windshield so that the user can see the subset of location sites without taking his/her eyes off of the road, or the results can be provide via audio.

Figure 8B:
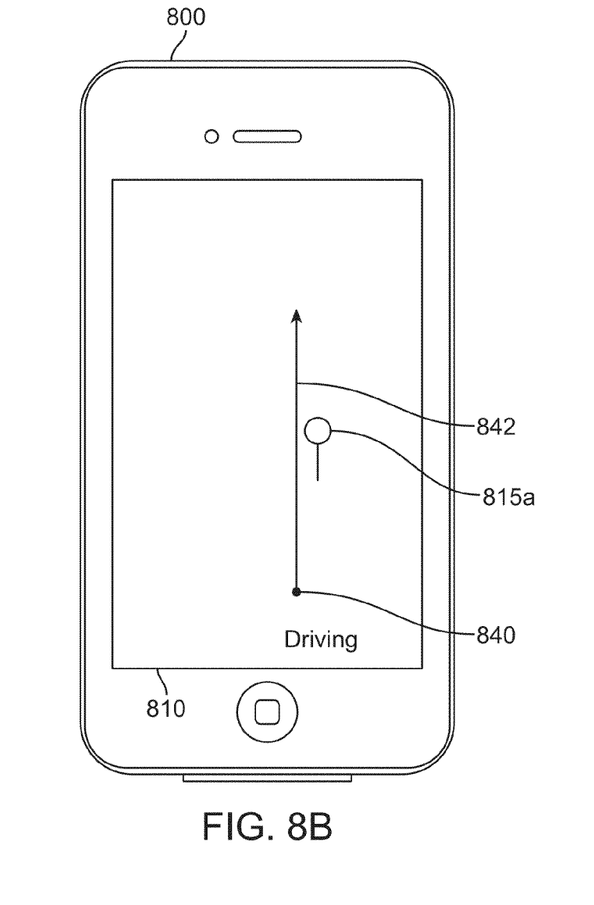
FIG. 8B shows mobile device displaying a result of a method of FIG. 7 where a subset of the location sites, specifically one location site, is displayed.

FIG. 8B shows mobile device 800 displaying a result of method 700 where only one (location site 815a) of the location sites 815 is displayed. Location site 815a can be selected based on the urgency term, as well as other criteria. Instead of not displaying the other location sites, the subset can be highlighted, and thus other location sites (i.e. ones not in the identified subset) can be provided with no highlighting.

Besides or in addition to the urgency terms, embodiments can decide to provide the subset based on other criteria. For example, if the person is far away from home, the location site requiring the fewest decision points (e.g., turns) can be chosen for displaying and/or providing directions.

VIII. Alerts not Based on Location

Alerts can also be provided based purely on context, where no particular location involved, just a switch from one context to another. For example, a reminder can be set based on "next time I go running" The concept of "running" can be associated with specific criteria, such as movement at a particular speed. The sensor information can be used to determine if certain trigger criteria is satisfied, and an alert can be provided when the sensor information corresponds to a particular context that an alert is associated. The sensor information can also be used to determine how to provide the alert, e.g., how to display the alert.

One example is to set a reminder to read a particular article (or study math) the next time I am on the train. Also, if this condition is triggered, then the mobile device might know that the user is busy (since that alert had just gone off), and this combination of events can provide a context where the perimeters of one or more geo-fences decrease due to the user being identified as busy.

VII. Device and Server

Figure 9A:
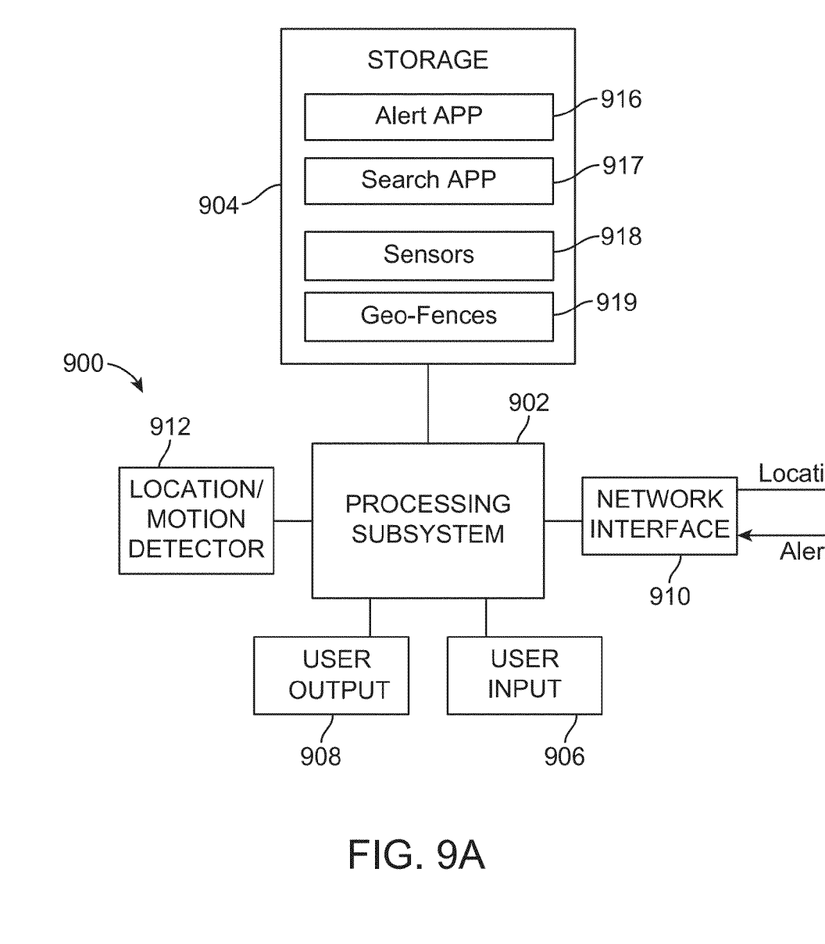
FIG. 9A is a simplified block diagram of an implementation of a device according to an embodiment of the present invention.

FIG. 9A is a simplified block diagram of an implementation of a device 900 according to an embodiment of the present invention. Device 900 can be a mobile device, a handheld device, a notebook computer, a desktop computer, or any suitable electronic device with a screen for displaying images and that is capable of communicating with a server 950 as described herein. Device 900 includes a processing subsystem 902, a storage subsystem 904, a user input device 906, a user output device 908, a network interface 910, and a location/motion detector 912.

Processing subsystem 902, which can be implemented as one or more integrated circuits (e.g., e.g., one or more single-core or multi-core microprocessors or microcontrollers), can control the operation of device 900. In various embodiments, processing subsystem 902 can execute a variety of programs in response to program code and can maintain multiple concurrently executing programs or processes. At any given time, some or all of the program code to be executed can be resident in processing subsystem 902 and/or in storage subsystem 904.

Through suitable programming, processing subsystem 902 can provide various functionality for device 900. For example, processing subsystem 902 can execute an alert application program (or "app") 916. Alert app 916 can perform all or parts of methods described herein, such as determining the perimeter of geo-fences (e.g., which can be stored in 919 or 968 of server 950), which ones are active, and when a geo-fence is crossed. Alert app 916 can use information from sensors 918 to determine the context, and then use the context to determine the perimeters and active status of geo-fences associated with various locations. Sensors 918 can be hardware or software sensors. Software sensors can be routines that obtain information, such as status variables specifying an operation of application or an operating system. Alert app 916 can use location information from location/motion detector 912, e.g., as described herein. Search app 917 can analyze input provided by user input 906, where the input can include search terms and urgency terms. Search app 917 can also use the context analysis of alert app 916.

Storage subsystem 904 can be implemented, e.g., using disk, flash memory, or any other storage media in any combination, and can include volatile and/or non-volatile storage as desired. In some embodiments, storage subsystem 904 can store one or more application programs to be executed by processing subsystem 902 (e.g., alert app 916). In some embodiments, storage subsystem 904 can store other data (e.g., used by and/or defined by alert app 916). Programs and/or data can be stored in non-volatile storage and copied in whole or in part to volatile working memory during program execution.

A user interface can be provided by one or more user input devices 906 and one or more user output devices 908. User input devices 906 can include a touch pad, touch screen, scroll wheel, click wheel, dial, button, switch, keypad, microphone, or the like. User output devices 908 can include a video screen, indicator lights, speakers, headphone jacks, or the like, together with supporting electronics (e.g., digital-to-analog or analog-to-digital converters, signal processors, or the like). A customer can operate input devices 906 to invoke the functionality of device 900 and can view and/or hear output from device 900 via output devices 908.

Network interface 910 can provide voice and/or data communication capability for device 900. For example, network interface 910 can provide device 900 with the capability of communicating with server 950. In some embodiments network interface 910 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 910 can provide wired network connectivity (e.g., Ethernet) in addition to or instead of a wireless interface. Network interface 910 can be implemented using a combination of hardware (e.g., antennas, modulators/demodulators, encoders/decoders, and other analog and/or digital signal processing circuits) and software components.

Location/motion detector 912 can detect a past, current or future location of device 900 and/or a past, current or future motion of device 900. For example, location/motion detector 912 can detect a velocity or acceleration of mobile electronic device 900. Location/motion detector 912 can comprise a Global Positioning Satellite (GPS) receiver and/or an accelerometer. In some instances, processing subsystem 902 determines a motion characteristic of device 900 (e.g., velocity) based on data collected by location/motion detector 912. For example, a velocity can be estimated by determining a distance between two detected locations and dividing the distance by a time difference between the detections.

Figure 9B:
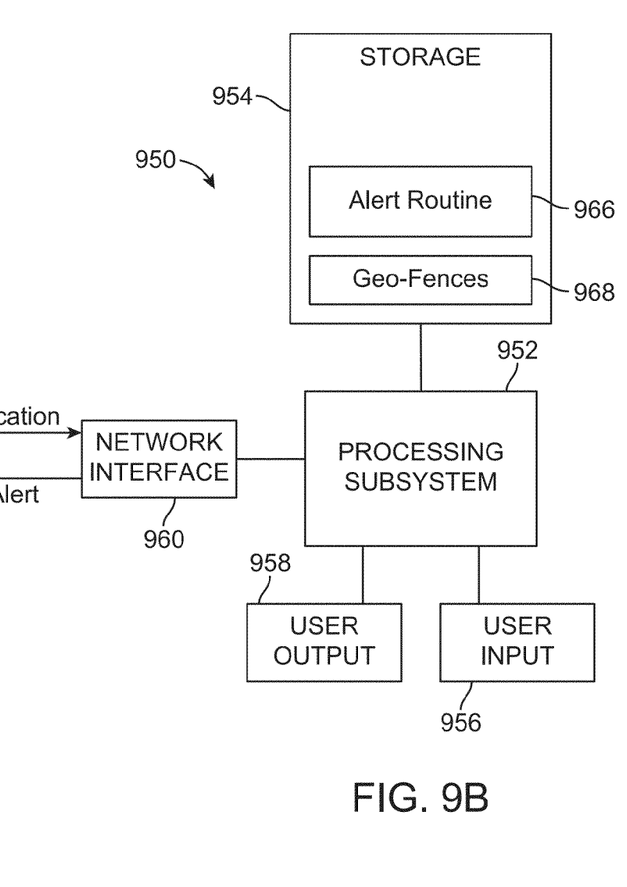
FIG. 9B is a simplified block diagram of an implementation of map server according to an embodiment of the present invention.

FIG. 9B is a simplified block diagram of an implementation of server 950 according to an embodiment of the present invention. Server 950 may be used for any server mentioned herein. Server 950 includes a processing subsystem 952, storage subsystem 954, a user input device 956, a user output device 958, and a network interface 960. Network interface 960 can have similar or identical features as network interface 910 of device 900 described above.

Processing subsystem 952, which can be implemented as one or more integrated circuits (e.g., a conventional microprocessor or microcontroller), can control the operation of server 950. In various embodiments, processing subsystem 952 can execute a variety of programs in response to program code and can maintain multiple concurrently executing programs or processes. At any given time, some or all of the program code to be executed can be resident in processing subsystem 952 and/or in storage subsystem 954.

Through suitable programming, processing subsystem 952 can provide various functionality for server 950. Thus, server 950 can interact with alert app 916 (e.g., via alert routine 966) being executed on device 900 in order to provide a context, a change in a perimeter of a geo-fence, whether a geo-fence has been crossed, an alert, and other information mentioned herein. In one embodiment, server 950 simply stores locations along with metadata about the location for querying, and sends the locations when a query for a search or for setting up an alert is performed. Geo-fences can also be stored in storage section 954. The geo-fences can be stored for each mobile device that the server servives.

Storage subsystem 954 can be implemented, e.g., using disk, flash memory, or any other storage media in any combination, and can include volatile and/or non-volatile storage as desired. In some embodiments, storage subsystem 954 can store one or more application programs to be executed by processing subsystem 952. In some embodiments, storage subsystem 954 can store other data, such as alert routine 966 and geo-fences 968. Programs and/or data can be stored in non-volatile storage and copied in whole or in part to volatile working memory during program execution.

A user interface can be provided by one or more user input devices 956 and one or more user output devices 958. User input and output devices 956 and 958 can be similar or identical to user input and output devices 906 and 908 of device 900 described above. In some instances, user input and output devices 956 and 958 are configured to allow a programmer to interact with server 950. In some instances, server 950 can be implemented at a server farm, and the user interface need not be local to the servers.

It will be appreciated that device 900 and server 950 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 900 and/or multiple servers 950, different devices 900 and/or servers 950 can have different sets of capabilities; the various devices 900 and/or servers 950 can be but need not be similar or identical to each other.

Further, while device 900 and server 950 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 900 and server 950 are described as singular entities, it is to be understood that each can include multiple coupled entities. For example, server 950 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of managing location-based alerts to a user of a mobile device, the method comprising:
   receiving, at an electronic device, instructions to provide a geo-fence around a location, the geo-fence having a perimeter, the perimeter being variable, wherein an alert is output from the mobile device when the mobile device crosses a current perimeter of the geo-fence;
   establishing, with the electronic device, the perimeter of the geo-fence to have a default size in response to receiving the instructions;
   detecting, with the electronic device, a change in a context of the mobile device to a first context; and
   decreasing, with the electronic device, the perimeter of the geo-fence to have a second size that is smaller than the default size in response to the change of the mobile device to the first context so as to reduce a number of alerts.

2. The method of claim 1, wherein the electronic device is the mobile device or a server communicably coupled with the mobile device.

3. The method of claim 1, further comprising:
   in response to the change of the mobile device to the first context, decreasing all perimeters of a plurality of geo-fences established for the mobile device.

4. The method of claim 1, wherein when the device has the first context and the perimeter has the second size, the mobile device cannot cross the perimeter.

5. The method of claim 1, wherein decreasing the perimeter of the geo-fence turns off the geo-fence and reduces the number of alerts to zero.

6. The method of claim 1, further comprising:
detecting that the first context is no longer valid; and
in response to detecting that the first context is no longer valid, increasing the perimeter of the geo-fence to have at least the default size.

7. The method of claim 1, wherein the output of the alerts includes audio, vibrational, and/or visual cues.

8. The method of claim 1, wherein the default size of the perimeter is defined as a circle with a specified radius around the location.

9. The method of claim 1, wherein the first context is that the mobile device is traveling on public transportation.

10. A computer product comprising a non-transitory computer readable medium storing a plurality of instructions that when executed control a computer system to manage location-based alerts to a user of a mobile device, the instructions comprising:
receiving instructions to provide a geo-fence around a location, the geo-fence having a perimeter, the perimeter being variable, wherein an alert is output from the mobile device when the mobile device crosses a current perimeter of the geo-fence;
establishing the perimeter of the geo-fence to have a default size in response to receiving the instructions;
detecting a change in a context of the mobile device to a first context; and
decreasing the perimeter of the geo-fence to have a second size that is smaller than the default size in response to the change of the mobile device to the first context so as to reduce a number of alerts.

11. A method of managing location-based alerts to a user of a mobile device, the method comprising:
receiving, at an electronic device, instructions to assign a respective geo-fence to each of a plurality of locations, each geo-fence having a perimeter that is variable, wherein an alert is output from the mobile device when the mobile device crosses a current perimeter of a geo-fence;
setting, with the electronic device, the perimeters of the geo-fences to have respective first sizes, the geo-fences including a first plurality of geo-fences and a second geo-fence;
detecting, with the electronic device, a change in a context of the mobile device; and
in response to the change in the context of the mobile device:
changing the respective perimeters of each of the first plurality of geo-fences to have respective second sizes that are different than the respective first sizes of the plurality of first geo-fences so as to change a number of alerts; and
keeping the perimeter of the second geo-fence at the respective first size of the second geo-fence.

12. The method of claim 11, wherein the change to the second sizes causes asymmetric changes in shapes of the respective perimeters of the first plurality of geo-fences.

13. The method of claim 11, wherein the respective first sizes are the same.

14. The method of claim 11, wherein the instructions are provided at a plurality of times.

15. The method of claim 11, wherein changing the respective perimeters of the first plurality of geo-fences to the respective second sizes turns on the plurality of geo-fences by increasing the respective perimeters of the first plurality of geo-fences so as to increase the number of alerts.

16. The method of claim 15, wherein turning on the first plurality of geo-fences is accomplished by changing the respective perimeters of the first plurality of geo-fences from zero to non-zero sizes.

17. The method of claim 15, wherein the instructions to assign respective geo-fences to each of the plurality of locations include a condition, and wherein the condition is that the mobile device has a first context, and wherein the detected change in the context of the mobile device is the mobile device entering the first context.

18. The method of claim 11, wherein changing the respective perimeters of the first plurality of geo-fences to the respective second sizes turns off the first plurality of geo-fences by decreasing the respective perimeters of the first plurality of geo-fences so as to reduce the number of alerts.

19. The method of claim 11, wherein the change in the context of the mobile device occurs as a result of a time since establishing a first geo-fence of the first plurality of geo-fences crossing a threshold, wherein the perimeter of the geo-fence is increased.

20. The method of claim 11, wherein the change in the context of the mobile device occurs as a result of a first application being executed on a processor of the mobile device.

21. The method of claim 11, further comprising:
receiving from a user of the mobile device a specification of the respective first size of a first geo-fence of the first plurality of geo-fences.

22. The method of claim 21, wherein the specification is received via a voice command, and wherein the respective first size is determined based on an urgency of the words used in the voice command.

23. The method of claim 1, wherein the change in the context includes at least one of: a change in a mode of transportation of the mobile device and a change in operation of the mobile device.

24. The computer product of claim 10, wherein the change in the context includes at least one of: a change in a mode of transportation of the mobile device and a change in operation of the mobile device.

25. The method of claim 11, wherein the geo-fences include a second plurality of geo-fences, and wherein the change in the context includes at least one of: a change in a mode of transportation of the mobile device and a change in operation of the mobile device, the method further comprising:
in response to the change in the context of the mobile device, keeping the respective perimeters of each of the second plurality of geo-fences at the respective first sizes of the second plurality of geo-fences.

* * * * *